United States Patent
Hammendorp et al.

(10) Patent No.: US 9,106,820 B1
(45) Date of Patent: Aug. 11, 2015

(54) MULTI-STAGE TRIGGER FOR CAPTURING VIDEO IMAGES

(71) Applicant: HERE Global B.V., LB Veldhoven (NL)

(72) Inventors: Maarten Hammendorp, Palo Alto, CA (US); Stephen Hartford, San Jose, CA (US); Pascal Wever, Los Angeles, CA (US); Andrew Gartrell, Woodland Hills, CA (US)

(73) Assignee: HERE Global B.V., LB Veldhoven (NL)

( * ) Notice: Subject to any disclaimer, the term of this patent is extended or adjusted under 35 U.S.C. 154(b) by 0 days.

(21) Appl. No.: 14/218,786

(22) Filed: Mar. 18, 2014

(51) Int. Cl.
*H04N 5/232* (2006.01)

(52) U.S. Cl.
CPC ........... *H04N 5/232* (2013.01); *H04N 5/23245* (2013.01); *H04N 5/23293* (2013.01); *H04N 5/23216* (2013.01)

(58) Field of Classification Search
CPC .............. H04N 5/23245; H04N 5/232; H04N 5/23293; H04N 5/23216
See application file for complete search history.

(56) References Cited

U.S. PATENT DOCUMENTS

| | | | |
|---|---|---|---|
| 7,760,240 B2 * | 7/2010 | Won et al. | 348/220.1 |
| 8,330,850 B2 * | 12/2012 | Miura | 348/346 |
| 8,428,453 B1 | 4/2013 | Spiegel et al. | |
| 2004/0090533 A1 * | 5/2004 | Dow et al. | 348/220.1 |
| 2004/0263633 A1 * | 12/2004 | Shinohara et al. | 348/207.99 |
| 2005/0031331 A1 * | 2/2005 | Su et al. | 396/106 |
| 2005/0057667 A1 * | 3/2005 | Shimizu et al. | 348/231.99 |
| 2005/0093988 A1 | 5/2005 | Haas et al. | |
| 2006/0044400 A1 * | 3/2006 | Lee | 348/207.99 |
| 2006/0051070 A1 * | 3/2006 | Itsukaichi | 386/117 |
| 2006/0055816 A1 | 3/2006 | Won et al. | |
| 2006/0067677 A1 * | 3/2006 | Tokiwa et al. | 396/502 |
| 2006/0238622 A1 * | 10/2006 | Shimosato | 348/220.1 |
| 2007/0195108 A1 * | 8/2007 | Furumochi | 345/589 |
| 2007/0285527 A1 * | 12/2007 | Kusayama et al. | 348/222.1 |
| 2009/0207279 A1 * | 8/2009 | Ochi et al. | 348/231.99 |
| 2010/0026843 A1 * | 2/2010 | Tezuka et al. | 348/231.2 |
| 2010/0225784 A1 * | 9/2010 | Sato et al. | 348/231.99 |
| 2011/0018971 A1 * | 1/2011 | Hasegawa | 348/47 |
| 2011/0134260 A1 | 6/2011 | Cho | |
| 2011/0134284 A1 * | 6/2011 | Kuriyama | 348/240.3 |

(Continued)

OTHER PUBLICATIONS

"In Which Situation to Long Press Shutter Button on DSLR?", Zqas Net, Retrieved on Apr. 1, 2014, Webpage available at : http://www.zqas.net/topic/qppkwi-in-which-situation-to-long-press-shutter-button-on-dsir.html.

*Primary Examiner* — Michael Osinski
(74) *Attorney, Agent, or Firm* — Alan Chen (57) ABSTRACT

Mechanisms are described for capturing video images using a multi-stage trigger button, where the effect of the trigger button is dependent on how a user interacts with the trigger button, such as during what timeframe the user releases the trigger button. For example, if the user ceases actuating the trigger button during a first time period following actuation, the capture of the video image is halted. If the user ceases actuating the trigger button during a second time period, the capture of the video image is continued. If the user ceases actuating the trigger button during a third time period, the capture of the video image is halted. Thus, for short actuations and long actuations, video images are only recorded while the trigger button is continued to be depressed. For video images in between, the video is continued to be recorded until a second actuation is received from the user.

20 Claims, 7 Drawing Sheets

(56) References Cited

U.S. PATENT DOCUMENTS

2011/0234881 A1* 9/2011 Wakabayashi et al. .. 348/333.05
2011/0298931 A1* 12/2011 Weisbach ...................... 348/162
2012/0050556 A1* 3/2012 Hamada ..................... 348/220.1
2012/0257077 A1* 10/2012 Suzuki ....................... 348/222.1
2013/0162850 A1* 6/2013 Noguchi .................... 348/208.4
2013/0162853 A1* 6/2013 Kim et al. .................. 348/220.1
2014/0071307 A1* 3/2014 Kunishige ................. 348/220.1

* cited by examiner

MULTI-STAGE TRIGGER FOR CAPTURING VIDEO IMAGES

TECHNOLOGICAL FIELD

Example embodiments of the present invention relate generally to mechanisms for capturing sensor data, such as capturing video images.

BACKGROUND

In a world of digital photography, smart phones with built-in cameras, and other mobile devices with integrated image capturing functionality, almost everyone has the ability to record moving and still images. From birthdays to soccer games, first steps to first dates, every memory can be captured and stored for future reference.

BRIEF SUMMARY OF EXAMPLE EMBODIMENTS

Accordingly, it may be desirable to provide tools that allow users to easily and effectively capture sensor data, such as images of events that take place around them. In this regard, example embodiments of the invention described herein provide a multi-stage trigger button that can be actuated by a user to take video recordings in several different ways depending on how the user actuates the button, such that the user can decide in real time how to record the video through interaction with the button alone and can achieve the desired result without the need to provide any other pre-determined settings.

In some embodiments, an apparatus may be provided that includes at least one processor and at least one memory including computer program code. The at least one memory and the computer program code may be configured to, with the processor, cause the apparatus to receive an indication that a trigger button has been actuated and cause sensor data to be captured in response to actuation of the trigger button. The memory and computer program code may be further configured to, with the processor, cause the apparatus to halt capture of the sensor data in an instance in which the actuation of the trigger button ceases during a first time period following actuation, continue capture of the sensor data in an instance in which the actuation of the trigger button ceases during a second time period following actuation, and halt capture of the sensor data in an instance in which the actuation of the trigger button ceases during a third time period following actuation, where the first, second and third time periods are mutually exclusive.

In some cases, the second time period may be subsequent to the first time period, and the third time period may be subsequent to the second time period. Moreover, the first time period may commence upon actuation of the trigger button and continue until a first predefined time; the second time period may commence at the first predefined time and continue until a second predefined time; and the third time period may commence at the second predefined time and continue thereafter until the actuation of the trigger button ceases. Additionally or alternatively, the at least one memory and the computer program code may be further configured to, with the at least one processor, cause the apparatus to receive an indication that the actuation of the trigger button has been ceased once the sensor data has been caused to be captured.

In some embodiments, the at least one memory and the computer program code may be further configured to, with the at least one processor, cause the apparatus to cause a display of a predefined type of indicia to commence during the second time period. The predefined type of indicia may comprise an elapsed recording time. Furthermore, the sensor data may comprise video images.

In other embodiments, a method and a computer program product are described that receive an indication that a trigger button has been actuated; cause sensor data to be captured in response to actuation of the trigger button; halt capture of the sensor data in an instance in which the actuation of the trigger button ceases during a first time period following actuation; continue capture of the sensor data in an instance in which the actuation of the trigger button ceases during a second time period following actuation; and halt capture of the sensor data in an instance in which the actuation of the trigger button ceases during a third time period following actuation, where the first, second and third time periods are mutually exclusive.

In some cases, the second time period may be subsequent to the first time period, and the third time period may be subsequent to the second time period. The first time period may commence upon actuation of the trigger button and continue until a first predefined time. Moreover, the second time period may commence at the first predefined time and continue until a second predefined time, and the third time period may commence at the second predefined time and continue thereafter until the actuation of the trigger button ceases.

In some cases, an indication that the actuation of the trigger button has been ceased may be received once the sensor data has been caused to be captured. Additionally or alternatively, a display of a predefined type of indicia may be caused to commence during the second time period. Furthermore, the sensor data may comprise video images in some cases.

In still other embodiments, an apparatus is provided for capturing sensor data, such as video images, using a multi-stage trigger button. The apparatus may include means for receiving an indication that a trigger button has been actuated; means for causing sensor data to be captured in response to actuation of the trigger button; means for halting capture of the sensor data in an instance in which the actuation of the trigger button ceases during a first time period following actuation; means for continuing capture of the sensor data in an instance in which the actuation of the trigger button ceases during a second time period following actuation; and means for halting capture of the sensor data in an instance in which the actuation of the trigger button ceases during a third time period following actuation, where the first, second and third time periods are mutually exclusive.

BRIEF DESCRIPTION OF THE SEVERAL VIEWS OF THE DRAWINGS

Having thus described example embodiments of the invention in general terms, reference will now be made to the accompanying drawings, which are not necessarily drawn to scale, and wherein:

DETAILED DESCRIPTION

Some example embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), can be differentiated from a "computer-readable transmission medium," which refers to an electromagnetic signal.

As devices for capturing images, such as video recorders, become more prevalent, the size of these devices has gotten more compact. In addition to stand-alone image capturing devices, several other types of mobile devices are now being made with the ability to allow a user to capture moving images of their surroundings, such as by including built-in cameras or video recording devices on smart phones. And with the increasingly small form factors of these devices comes a decrease in the amount of space that is available to provide user controls for various image capturing functions. At the same time, users' needs for capturing images in various situations and under different circumstances are growing more complex, and their expectations with respect to the quality of those images are becoming more exacting.

With conventional image capturing devices, such as cameras and video recorders, appropriate trigger button behavior is important for ensuring that clean, crisp images are recorded in a variety of situations. The trigger button is typically a push-button (or, in some cases, a virtual button displayed on a touch screen display of the device) that is actuatable by a user to capture a still picture or video recording. In conventional cameras used for still pictures, for example, when the trigger button is pressed and released by the user, the shutter of the camera is momentarily opened to capture a picture of the scene being viewed through the camera lens, and then the shutter is returned to its closed state. In a conventional video recorder used for recording video images, depressing and releasing the trigger button once initiates the recording of a video. When the user wishes to stop the recording, the user presses and releases the trigger button a second time.

Each time a user presses and releases the trigger button in the scenarios described above, the user applies a force to and then removes the force from the image capturing device. This application and removal of force can, in some cases, result in the movement of the device itself, which may in turn disrupt the continuity or clarity of the images being recorded. For example, each time the user presses and releases the trigger button, there is a risk that the user may accidentally "shake" the image capturing device, thereby causing the captured image to be compromised (e.g., become blurred, unsteady, off-subject, etc.).

When the duration of the shot (e.g., the duration of the video being recorded) is relatively short, such as on the order of several seconds long, an induced shaking of the image capturing device could result in there being no usable portion of the recorded video because the duration of the "shake" may be a substantial portion of the duration of the shot. When the duration of the shot is longer, such as on the order of around 30 seconds or more, an induced shaking of the image capturing device may only alter the first and last second or two of the recorded video, which may be unnoticeable or unproblematic when the entire length of the recorded video is considered.

Figure 1A:
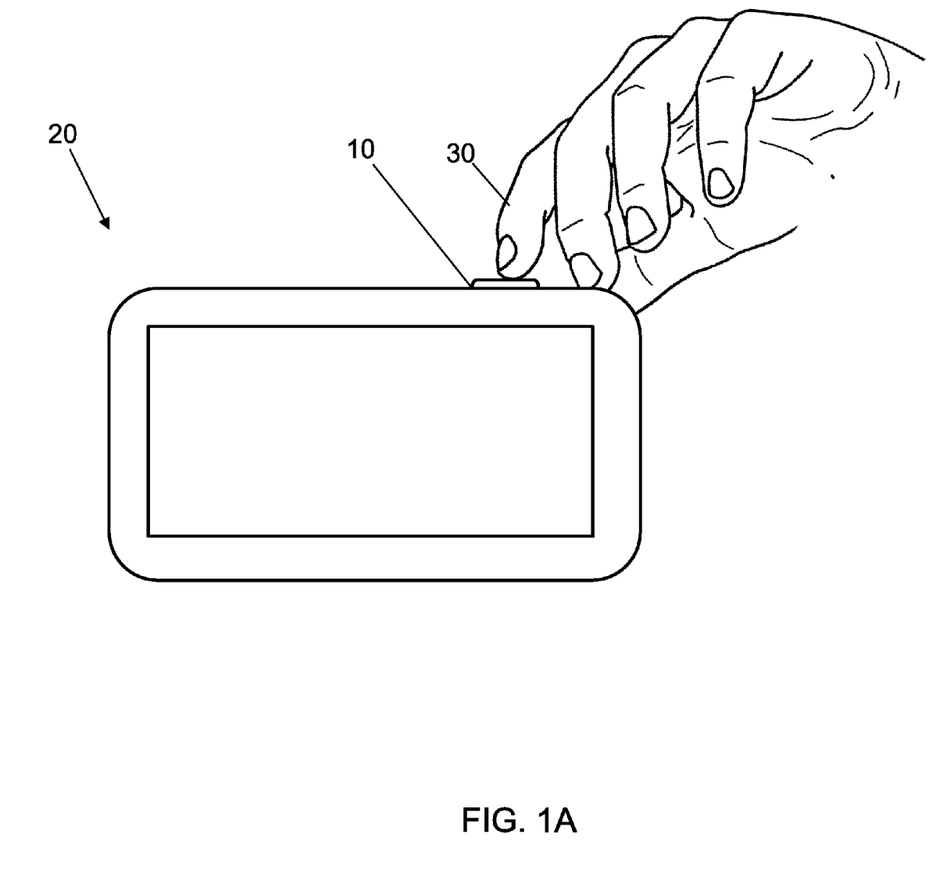
FIG. 1A shows a user actuating a trigger button of an image capturing device according to an example embodiment of the present invention.
Figure 1B:
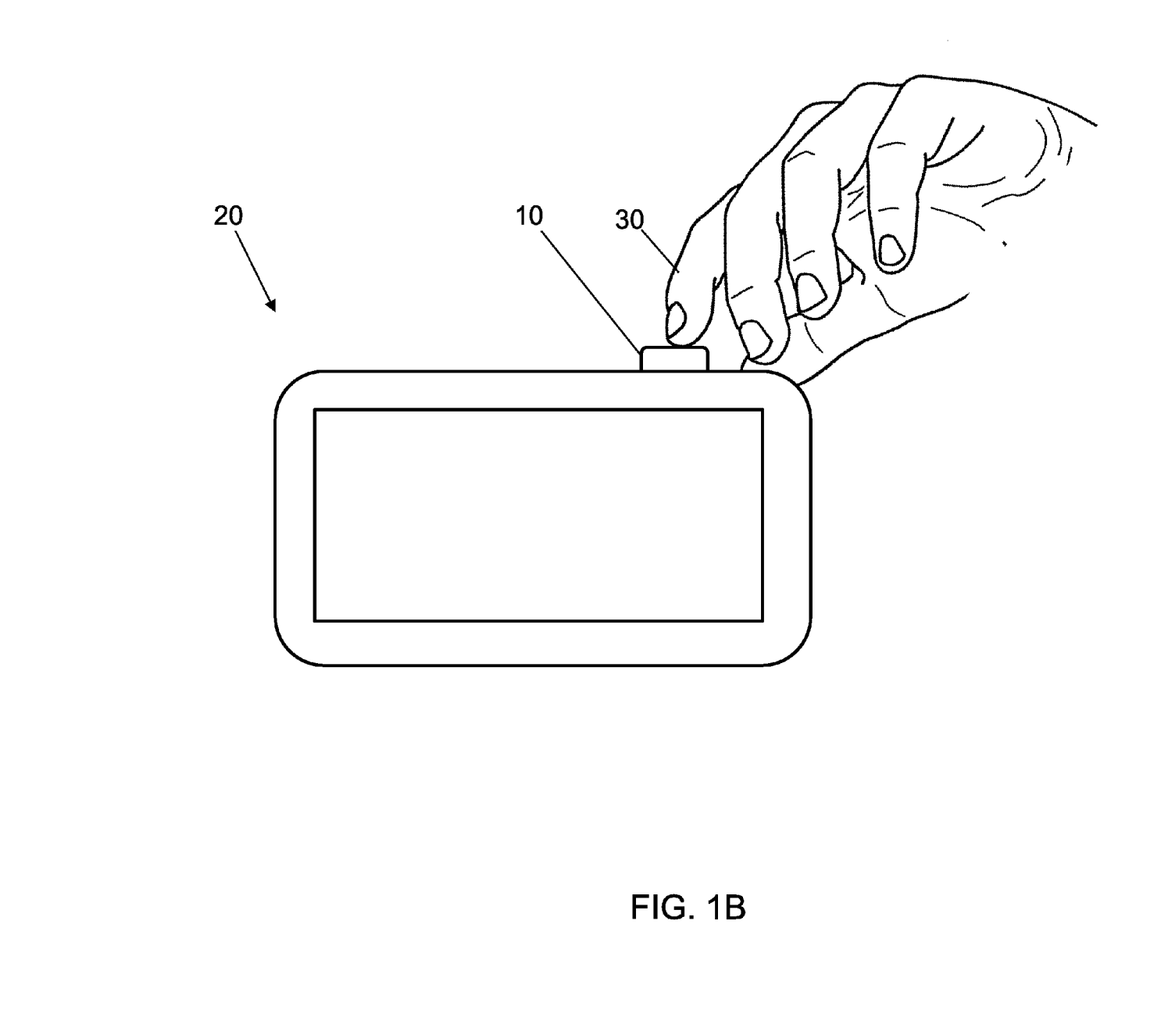
FIG. 1B shows a user ceasing to actuate the trigger button of FIG. 1A according to an example embodiment of the present invention.

Accordingly, example embodiments of the present invention provide mechanisms for altering the behavior of the trigger button on an image capturing device based on how the user actuates the trigger button, such that in some cases actuation of the trigger button initiates the continuous capture of an image, whereas in other cases actuation of the trigger button only causes the image to be captured while the button is being actuated. In this regard, the term "actuation" as used herein refers to the user's pressing of the button. FIG. 1A, for example, shows a user actuating the trigger button 10 of an image capturing device 20 via the user's finger 30. With reference to FIG. 1A, the action of contacting and applying force to the button to move the respective image capturing device from a closed shutter position to an open shutter position is referenced herein as an actuation of the button. Subsequently removing force from the button to move the respective image capturing device from the open shutter position to the closed shutter position as shown in FIG. 1B and is referenced herein as ceasing the actuation of the button. A single actuation may have durations of various lengths, depending, for example, on how long the user continues to apply force to the button 10 to maintain the button in a depressed state (FIG. 1A).

Figure 2:
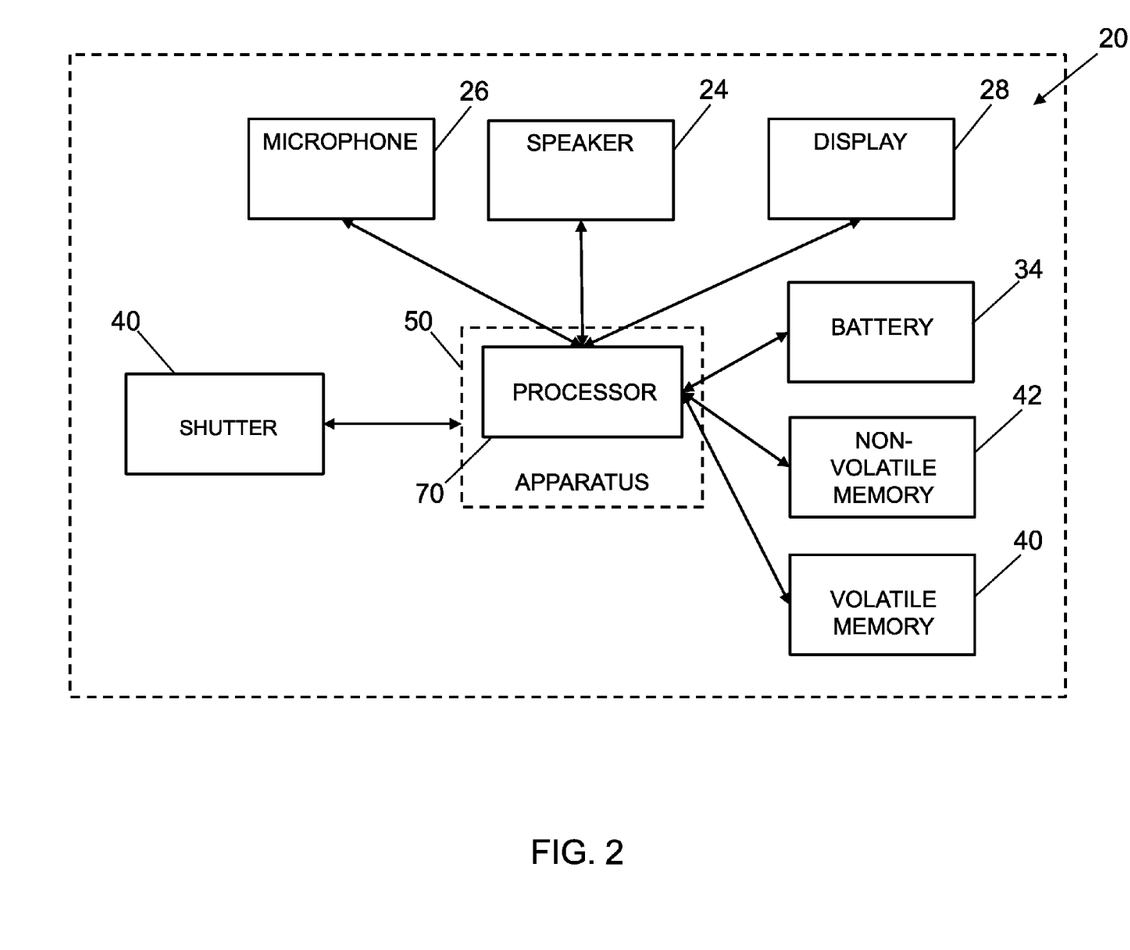
FIG. 2 illustrates one example of an image capturing system according to an example embodiment of the present invention.

Turning now to FIG. 2, which provides one example embodiment, a block diagram of an image capturing device 20 that would benefit from embodiments of the present invention is illustrated. The image capturing device 20 may be any device that is or includes a camera or other media capturing element configured to capture still images or video of objects, people, and places proximate to the user of the image capturing device. It should be understood, however, that the image capturing device 20 as illustrated and hereinafter described is merely illustrative of one type of device that may benefit from embodiments of the present invention and, therefore, should not be taken to limit the scope of embodiments of the present invention. For example, in some embodiments the image capturing device 20 may be a stand-alone device, or a device configured for the primary purpose of capturing images (e.g., still pictures and video recordings), such as a camera or video recorder, whereas in on other embodiments the image capturing device 20 may be a component or feature of another device, such as a portable digital assistant (PDA), mobile telephone, pager, mobile television, gaming device, laptop computer, tablet computer, touch surface, wearable device, or any combination of the aforementioned, and other types of voice and text communications systems.

Figure 3:
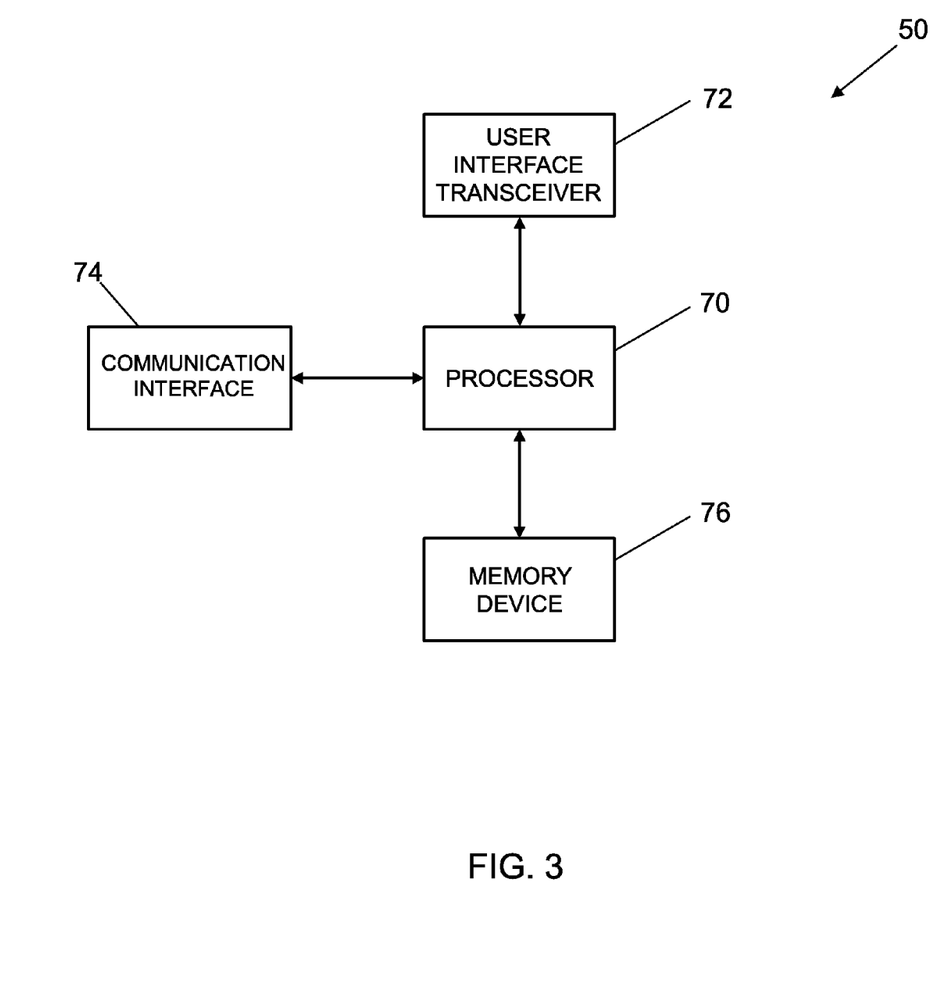
FIG. 3 illustrates a schematic block diagram of an apparatus for capturing video images using a multi-stage trigger button according to an example embodiment of the present invention.

Referring again to FIG. 2, the image capturing device 20 may include an apparatus 50, such as or including a processor 70 or other processing device, which controls the functions of one or more components of the image capturing device 20. The apparatus 50, including a processor 70, is shown in FIG. 3. For example, among other functions, the apparatus 50 (e.g., via the processor 70) may control the opening and closing of a shutter 40 of the image capturing device 20 so as to direct the starting and stopping of a video recording. In some embodiments, the processor 70 may control other aspects of the capture of video images, such as zooming, rotation, panning, fading, or other visual effects or manipulations that may be performed on the image prior to, during, or subsequent to the capture of the images.

With reference to FIGS. 2 and 3, in some embodiments, the processor 70 may include circuitry desirable for implementing audio and logic functions of the image capturing device 20. For example, the processor 70 may be comprised of a digital signal processor device, a microprocessor device, and various analog to digital converters, digital to analog converters, and other support circuits. Control and signal processing functions of the image capturing device 20 are allocated between these devices according to their respective capabilities. The processor 70 may include functionality to operate one or more software programs, which may be stored in memory.

The image capturing device 20 may also comprise a user interface including an output device such as a conventional earphone or speaker 24, a microphone 26, a display 28, and a user input interface, all of which are coupled to the processor 70. The user input interface, which allows the image capturing device 20 to receive data, may include any of a number of devices allowing the image capturing device 20 to receive data, such as a keypad, a touch screen display (display 28 providing an example of such a touch screen display), a trigger button, or other input device. In embodiments including a keypad, the keypad may include the conventional numeric (0-9) and related keys (#, *), and other hard and soft keys used for operating the image capturing device 20. Alternatively or additionally, the keypad may include a conventional QWERTY keypad arrangement. The keypad may also include various soft keys with associated functions. In addition, or alternatively, the image capturing device 20 may include an interface device such as a joystick or other user input interface. The image capturing device 20 may further include a battery 34, such as a vibrating battery pack, for powering various circuits that are required to operate the image capturing device 20.

The image capturing device 20 may further include volatile memory 40, such as volatile Random Access Memory (RAM) including a cache area for the temporary storage of data. The image capturing device 20 may also include other non-volatile memory 42, which may be embedded and/or may be removable. The memories may store any of a number of pieces of information, and data, used by the image capturing device 20 to implement the functions of the image capturing device 20. Moreover, the memories may store one or more captured images, including video recordings that are captured by the image capturing device 20.

It should also be noted that while FIG. 2 illustrates one example of a configuration of an image capturing device 20 configured to capture images using a multi-stage trigger button, numerous other configurations may also be used to implement embodiments of the present invention. As such, in some embodiments, although devices or elements are shown as being in communication with each other, hereinafter such devices or elements should be considered to be capable of being embodied within a same device or element and, thus, devices or elements shown in communication should be understood to alternatively be portions of the same device or element.

With reference to FIG. 3, the apparatus 50 for capturing images using a multi-stage trigger button may include or otherwise be in communication with a processor 70, a user interface transceiver 72, a communication interface 74, and a memory device 76. In some embodiments, the processor 70 (and/or co-processors or any other processing circuitry assisting or otherwise associated with the processor 70) may be in communication with the memory device 76 via a bus for passing information among components of the apparatus 50. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, content, applications, instructions, or the like for enabling the apparatus to carry out various functions in accordance with an example embodiment of the present invention. For example, the memory device 76 could be configured to buffer input data for processing by the processor 70. Additionally or alternatively, the memory device 76 could be configured to store instructions for execution by the processor 70, as well as video images captured by the image capturing device 20 and/or alterations or modifications to the images provided by the user.

The apparatus 50 may, in some embodiments, be a mobile terminal with image capturing capability (e.g., a smartphone), an image capturing device (e.g., the image capturing device 20), or a fixed communication device or computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard-coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. Additionally or alternatively, the communication interface 74 may include the circuitry for interacting with the antenna(s) to cause transmission of signals via the antenna(s) or to handle receipt of signals received via the antenna(s). In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

Figure 5:
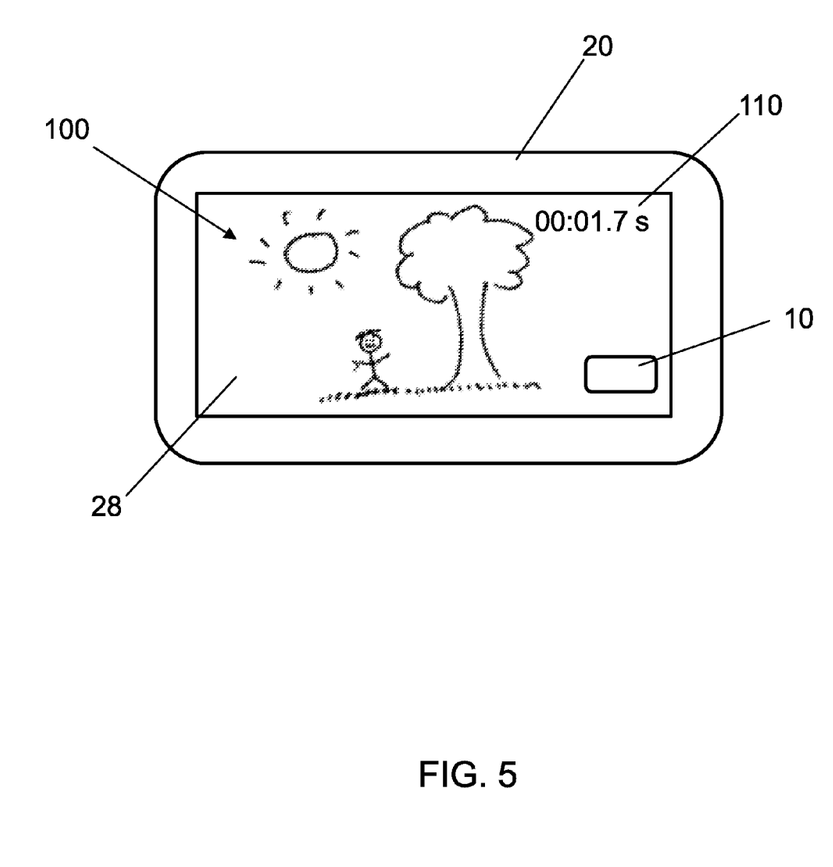
FIG. 5 illustrates an image capturing device for which a predefined type of indicia is shown on a display according to an example embodiment of the present invention.

The user interface transceiver 72 may be in communication with the processor 70 to receive an indication of a user input and/or to cause provision of an audible, visual, mechanical or other output to the user. As such, the user interface transceiver 72 may include, for example, a keyboard, a mouse, a joystick, a display, a touch screen(s), touch areas, soft keys, a microphone, a speaker, or other input/output mechanisms. For example, the user interface transceiver 72 may include a touch screen display 28 that is configured to present a virtual trigger button for actuation by the user, as shown in FIG. 5. In other embodiments, however, the user interface transceiver 72 may include a physical trigger button (e.g., the trigger button 10 of FIGS. 1A and 1B) that is actuatable by the user. Alternatively or additionally, the processor 70 may comprise user interface circuitry configured to control at least some functions of one or more user interface elements such as, for example, a speaker, microphone, display, and/or the like. The processor 70 and/or user interface circuitry comprising the processor 70 may be configured to control one or more functions of one or more user interface elements through computer program instructions (e.g., software and/or firmware) stored on a memory accessible to the processor 70 (e.g., memory device 76, and/or the like).

An example embodiment of the invention will now be described with reference to the figures. As noted above, conventional trigger buttons are pre-configured to effect a certain action in response to actuation by the user. For example, in a conventional video recorder, depressing and releasing the trigger button initiates the recording of a video. The video continues to be recorded until the user depresses and releases the trigger button again. Thus, the duration of the video recording corresponds to the length of time between the user's first and second actuations of the trigger button. In some cases, the video may be 1 second long; in other cases the video may be 2 seconds long; and in still other cases the video may be 5 seconds, 30 seconds, or 130 seconds long. Regardless of the duration of the video, the trigger button on a conventional image capturing device is configured to elicit the same function of the image capturing device.

As noted above, when recording short duration video images, any shake or disturbance to the image capturing device caused, for example, by actuating the trigger button a first time to start capturing the video and then actuating the trigger button a second time to cease capturing the video may seriously impair, if not ruin, the recording due to the short duration of the video. Thus, in cases in which the user wishes to record a short video, the user may achieve a better result if he or she were able to actuate the trigger button only once, such as by depressing the button to start recording, holding the button down for the duration of the time the user wishes to record, and then releasing the button when the user wishes to cease recording. At the same time, for longer portions of video, the user's finger may get tired of holding the trigger button down for extended periods of time. In such cases, it may be easier for the user to actuate the trigger button once to initiate the recording, record the video images without actuating the button during the recording, and then actuate the trigger button a second time to cease recording.

Accordingly, example embodiments of the present invention provide mechanisms for controlling the trigger button such that a different response is elicited depending on the duration of the actuation and/or the timeframe in which the actuation is ceased. In this way, video images can be captured with minimal disturbance (e.g., from shaking imparted by button actuation as described above) depending on the situation, and the user need not know ahead of time how long of a video will be captured because no advance setting of a mode (e.g., continuous recording versus recording only while a button is depressed) is required. Rather, the apparatus described herein is responsive to the situation as it occurs to provide the optimal recording experience.

Figure 4:
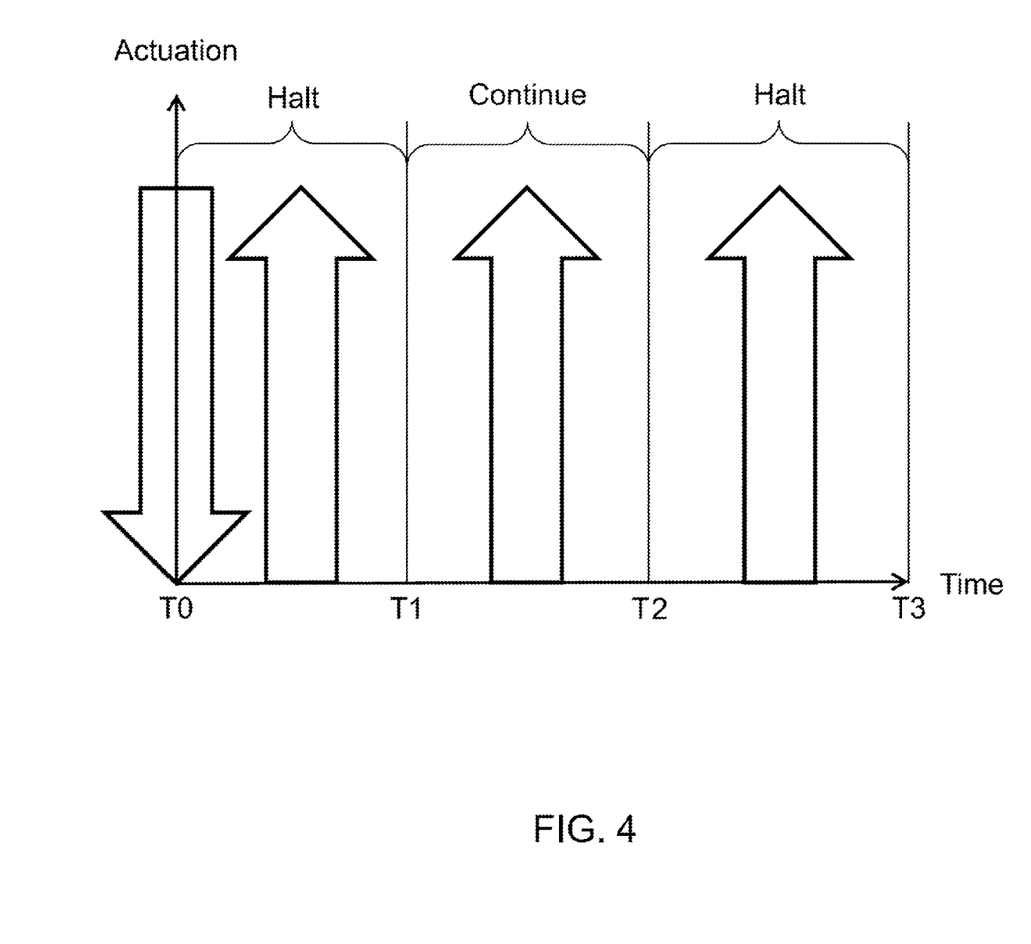
FIG. 4 illustrates different timeframes for ceasing actuation of the multi-stage trigger button and the effect when the cessation occurs in each timeframe according to an example embodiment of the present invention.

In this regard, the apparatus 50 may comprise at least one processor 70 and at least one memory 76 including computer program code, as shown in FIG. 3. The at least one memory 76 and the computer program code may be configured to, with the processor 70, cause the apparatus 50 to at least receive an indication that a trigger button has been actuated and cause video images to be captured in response to actuation of the trigger button. In an instance in which the actuation of the trigger button (e.g., occurring at T0) ceases during a first time period T0-T1 following actuation, as shown in FIG. 4, the at least one memory and the computer program code may be configured to, with the processor, cause the apparatus to halt capture of the video images. In an instance in which the actuation of the trigger button ceases during a second time period T1-T2 following actuation, however, the at least one memory and the computer program code may be configured to, with the processor, cause the apparatus to continue capture of the video images. In an instance in which the actuation of the trigger button ceases during a third time period T2-T3 following actuation, the at least one memory and the computer program code may be configured to, with the processor, cause the apparatus to halt capture of the video images. As shown in FIG. 4, the first, second, and third time periods are mutually exclusive. In FIG. 4, a user's depressing of the trigger button to actuate the trigger button is represented by a downward arrow, whereas release of the trigger button to cease actuation is represented by an upward arrow.

Said differently, to start a recording, the user would press the trigger button (e.g., provide a full press) and hold the trigger button down for a period of time. If the trigger button is held down for a duration exceeding a first predefined threshold of time (e.g., longer than time T1), but less than a second predefined threshold of time (e.g., releasing before time T2 is reached), then even after the user releases the trigger button, the image capturing device may continue to record the video. In this case, the user would halt the recording by actuating the trigger button a second time (not shown). If the user instead continues to hold down the trigger button in a full press for a period of time that is longer than the second threshold of time (e.g., continuing to press down on the trigger button past time T2), subsequent release of the trigger button causes the recording to stop.

In some embodiments, the second time period T1-T2 may be subsequent to the first time period T0-T1, and the third time period T2-T3 may be subsequent to the second time period T1-T2, as shown in the depicted example of FIG. 4. In other embodiments, however, the time periods may be arranged in a chronologically different manner. Furthermore, in some embodiments, the first time period T0-T1 may commence upon actuation of the trigger button (e.g., at T0) and may continue until a first predefined time T1, as described above with respect to FIG. 4. The second time period T1-T2 may commence at the first predefined time T1 and may continue until a second predefined time T2, and the third time period T2-T3 may commence at the second predefined time T2 and continue thereafter until the actuation of the trigger button ceases (e.g., at T3). As an example, in some embodiments, the first predefined time T1 may be approximately 1.5 seconds; the second predefined time T2 may be approximately 2.5 seconds; and the third predefined time T3 may be any time longer than 2.5 seconds. In other embodiments, however, the first predefined time T1 may be greater than or less than 1.5 seconds (e.g., approximately 1 second to approximately 4 seconds), and the second predefined time T2 may be greater than or less than 2.5 seconds (e.g., approximately 1.5 seconds to approximately 7 seconds).

In some embodiments, the at least one memory and the computer program code may be configured to, with the processor, cause the apparatus to receive an indication that the actuation of the trigger button has been ceased once the video images have been caused to be captured. Said differently, the apparatus may be caused (e.g., via the processor) to receive an indication (e.g., from the trigger button) that the user has released the trigger button after the user records a video. The apparatus may be configured to (via the processor) determine the time that the actuation ceased with respect to the time the actuation started, and, based on the timing, the apparatus may be configured to determine whether the actuation of the trigger button was ceased during the first time period, the second time period, or the third time period so as to cause the appropriate function (e.g., halting the recording or continuing to record) to be executed.

Referring to FIG. 5, in some embodiments, the at least one memory and the computer program code may be configured to, with the processor, cause the apparatus to cause a display of a predefined type of indicia to commence during the second time period. For example, an image capturing device 20 comprising or embodying the apparatus described above may include a display 28 via which the user may see the image 100 being recorded. In some embodiments, in an instance in which the user depresses the trigger button 10 (which is a virtual button presented on the display 28 in the example shown in FIG. 5) at time T0 and continues to hold down the trigger button through the first predefined time T1 (shown in FIG. 4), a predefined type of indicia 110 may be presented on the display. The predefined type of indicia 110 may be an icon, text, light, color, flashing light or text, flashing light emitting diode (LED) indicator, vibration, or other effect. In this way, the user may be able to visually identify that releasing the trigger button 10 during the display of the indicia 110 would cause the capture of video images to be continued until the user actuates the trigger button a second time, as described above with respect to FIG. 4.

For example, as depicted in FIG. 5, the predefined type of indicia 110 may comprise an elapsed recording time. In this case, during the first time period T0-T1, no indicia 110 may be presented. During the second time period T1-T2, the indicia 110 may be presented, as shown in FIG. 5, and may provide the user with an indication of the elapsed recording time. In an example in which T1 is 1.5 seconds and T2 is 2.5 seconds, the indicia 110 may begin to be presented at time T1 and may display the time 00:01.5 s. The indicia 110 in this case may continuously change to reflect the elapsed time. Thus, in the depicted example of FIG. 5, the instantaneous elapsed time shown as the indicia 110 is 00:01.7 seconds.

In some cases, the at least one memory and the computer program code may be configured to, with the processor, cause the apparatus to cause a display of a predefined type of indicia to cease following the second time period T1-T2 or may cause a display of another, different predefined type of indicia to indicate entry into the third time period T2-T3. In this case, continuing the elapsed time example described above, the predefined type of indicia 110 may be removed from the display at time T2. Thus, in the example in which T2 is 2.5 seconds, the time 00:02.4 may be presented, but at time 00:02.5 the elapsed time may no longer be presented on the display 28. The absence of the predefined type of indicia 110 may indicate to the user that releasing the trigger button 10 will cause the capture of video images to halt, regardless of whether the user recognizes which time period (e.g., the first time period T0-T1 or the third time period T2-T3) he or she is in. Alternatively, for example, the elapsed time displayed may be presented as flashing during the second time period T1-T2, but may be presented continuously during the third time period T2-T3.

Figure 6:
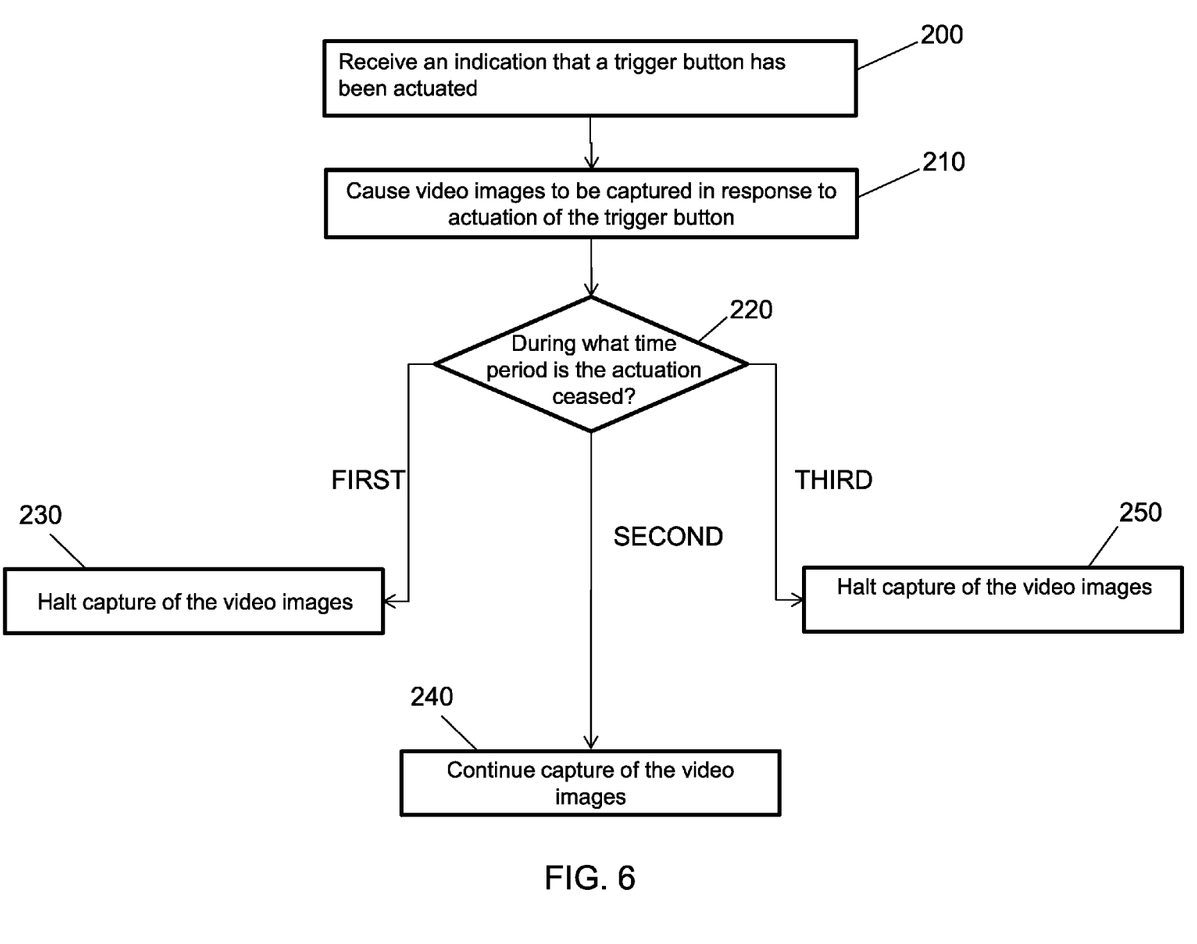
FIG. 6 illustrates a flowchart of methods of capturing video images using a multi-stage trigger button according to an example embodiment of the present invention.

FIG. 6 illustrates a flowchart of systems, methods, and computer program products according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device of an apparatus employing an example embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus implements the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions, combinations of operations for performing the specified functions, and program instruction means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, one example embodiment of a method for controlling the capture of video images using a multi-stage trigger button is shown in FIG. 6. FIG. 6 depicts an example embodiment of the method that includes receiving an indication that a trigger button has been actuated at block 200 and causing video images to be captured in response to actuation of the trigger button at block 210. According to the method, a determination may be made as to the time period in which the actuation of the trigger button ceased at block 220. In an instance in which the actuation of the trigger button ceases during a first time period following actuation, the capture of video images is halted at block 230. In an instance in which the actuation of the trigger button ceases during a second time period following actuation, the capture of video images is continued at block 240. In an instance in which the actuation of the trigger button ceases during a third time period following actuation, the capture of video images is halted at block 250. As noted above, the first, second, and third time periods are mutually exclusive.

In some cases, the second time period may be subsequent to the first time period, and the third time period may be subsequent to the second time period. The first time period may commence upon actuation of the trigger button and may continue until a first predefined time. Moreover, the second time period may commence at the first predefined time and may continue until a second predefined time, and the third time period may commence at the second predefined time and may continue thereafter until the actuation of the trigger button ceases, as described above.

An indication that the actuation of the trigger button has been ceased may be received once the video images have been caused to be captured. Furthermore, a display of a predefined type of indicia may be caused to commence during the second time period at block, as described above. For example, the predefined type of indicia may comprise an elapsed recording time.

In some embodiments, certain ones of the operations above may be modified or further amplified as described below. Furthermore, in some embodiments, additional optional operations may be included. Although the operations above are shown in a certain order in FIG. 6, certain operations may be performed in any order. In addition, modifications, additions, or amplifications to the operations above may be performed in any order and in any combination.

In an example embodiment, an apparatus for performing the methods of FIG. 6 above may comprise a processor (e.g., the processor 70 of FIGS. 2 and 3) configured to perform some or each of the operations (200-250) described above. The processor may, for example, be configured to perform the operations (200-250) by performing hardware implemented logical functions, executing stored instructions, or executing algorithms for performing each of the operations.

Alternatively, the apparatus may comprise means for performing each of the operations described above. In this regard, according to an example embodiment, examples of means for performing operation 200 may comprise, for example, the processor 70, the user interface transceiver 72, and/or a device or circuit for executing instructions or executing an algorithm for processing information as described above. Examples of means for performing operations 210, 230, 240, and 250 may comprise, for example, the processor 70 and/or a device or circuit for executing instructions or executing an algorithm for processing information as described above. Examples of means for performing operation 220 may comprise, for example, the memory device 76, the processor 70, and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. For example, although the description and examples included above refer to the capture of video recordings, embodiments of the invention may be applied to the capture of any real-world phenomena that changes over time, including the recording of audio, motion data, or any other data that is detectable and recordable, such as via a sensor. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   receiving an indication that a trigger button has been actuated;
   causing, with a processor, sensor data to be captured in response to actuation of the trigger button;
   halting the capture of the sensor data in an instance in which the actuation of the trigger button ceases during a first time period following the actuation;
   continuing the capture of the sensor data in an instance in which the actuation of the trigger button ceases during a second time period following the actuation; and
   halting the capture of the sensor data in an instance in which the actuation of the trigger button ceases during a third time period following the actuation,
   wherein the first, second and third time periods are mutually exclusive.

2. The method according to claim 1 wherein the second time period is subsequent to the first time period, and wherein the third time period is subsequent to the second time period.

3. The method according to claim 2 wherein the first time period commences upon actuation of the trigger button and continues until a first predefined time.

4. The method according to claim 3 wherein the second time period commences at the first predefined time and continues until a second predefined time, and wherein the third time period commences at the second predefined time and continues thereafter until the actuation of the trigger button ceases.

5. The method according to claim 1 further comprising receiving an indication that the actuation of the trigger button has been ceased once the sensor data has been caused to be captured.

6. The method according to claim 1 further comprising causing a display of a predefined type of indicia to commence during the second time period.

7. The method according to claim 1 wherein the sensor data comprises video images.

8. An apparatus comprising:
   at least one a processor; and
   at least one memory including computer program code, the at least one memory and the computer program code configured to, with the at least one processor, cause the apparatus at least to:
   receive an indication that a trigger button has been actuated;
   cause sensor data to be captured in response to actuation of the trigger button;
   halt the capture of the sensor data in an instance in which the actuation of the trigger button ceases during a first time period following the actuation;
   continue the capture of the sensor data in an instance in which the actuation of the trigger button ceases during a second time period following the actuation; and
   halt the capture of the sensor data in an instance in which the actuation of the trigger button ceases during a third time period following the actuation,
   wherein the first, second and third time periods are mutually exclusive.

9. The apparatus according to claim 8 wherein the second time period is subsequent to the first time period, and wherein the third time period is subsequent to the second time period.

10. The apparatus according to claim 9 wherein the first time period commences upon actuation of the trigger button and continues until a first predefined time, wherein the second time period commences at the first predefined time and continues until a second predefined time, and wherein the third time period commences at the second predefined time and continues thereafter until the actuation of the trigger button ceases.

11. The apparatus according to claim 8 wherein the at least one memory and the computer program code are further configured to, with the at least one processor, cause the apparatus to receive an indication that the actuation of the trigger button has been ceased once the sensor data has been caused to be captured.

12. The apparatus according to claim 8 wherein the at least one memory and the computer program code are further configured to, with the at least one processor, cause the apparatus to cause a display of a predefined type of indicia to commence during the second time period.

13. The apparatus according to claim 12 wherein the predefined type of indicia comprises an elapsed recording time.

14. The apparatus according to claim 8 wherein the sensor data comprises video images.

15. A computer program product comprising at least one non-transitory computer-readable storage medium having computer-executable program code portions stored therein, the computer-executable program code portions comprising program code instructions for causing a computer to perform a method comprising:
   receiving an indication that a trigger button has been actuated;
   causing sensor data to be captured in response to actuation of the trigger button;
   halting the capture of the sensor data in an instance in which the actuation of the trigger button ceases during a first time period following the actuation;
   continuing the capture of the sensor data in an instance in which the actuation of the trigger button ceases during a second time period following the actuation; and
   halting the capture of the sensor data in an instance in which the actuation of the trigger button ceases during a third time period following the actuation,
   wherein the first, second and third time periods are mutually exclusive.

16. The computer program product according to claim 15 wherein the second time period is subsequent to the first time period, and wherein the third time period is subsequent to the second time period.

17. The computer program product according to claim 16 wherein the first time period commences upon actuation of the trigger button and continues until a first predefined time, wherein the second time period commences at the first predefined time and continues until a second predefined time, and wherein the third time period commences at the second predefined time and continues thereafter until the actuation of the trigger button ceases.

18. The computer program product according to claim 15 wherein the computer-executable program code portions further comprise program code instructions for receiving an indication that the actuation of the trigger button has been ceased once the sensor data has been caused to be captured.

19. The computer program product according to claim 15 wherein the computer-executable program code portions further comprise program code instructions for causing a display of a predefined type of indicia to commence during the second time period.

20. The computer program product according to claim 19 wherein the sensor data comprises video images.

* * * * *